(12) United States Patent
Hopkins et al.

(10) Patent No.: US 7,318,160 B2
(45) Date of Patent: Jan. 8, 2008

(54) CRYPTOGRAPHIC KEY SETUP IN QUEUED CRYPTOGRAPHIC SYSTEMS

(75) Inventors: Dale W. Hopkins, Georgetown, KY (US); Thomas W. Collins, Saratoga, CA (US); Steven W. Wierenga, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1012 days.

(21) Appl. No.: 10/062,808

(22) Filed: Feb. 1, 2002

(65) Prior Publication Data

US 2003/0149883 A1    Aug. 7, 2003

(51) Int. Cl.
*H04L 9/00* (2006.01)
*H04K 1/00* (2006.01)

(52) U.S. Cl. ......................................... 713/189; 380/28
(58) Field of Classification Search ................ 713/200, 713/191, 187, 189
See application file for complete search history.

(56) References Cited

U.S. PATENT DOCUMENTS

| | | | | |
|---|---|---|---|---|
| 6,504,930 B2* | 1/2003 | Enari | ........................... | 380/37 |
| 6,834,111 B1* | 12/2004 | Nishimura et al. | ......... | 380/255 |
| 6,870,929 B1* | 3/2005 | Greene | ........................ | 380/28 |
| 2003/0023846 A1* | 1/2003 | Krishna et al. | ............. | 713/162 |
| 2003/0212886 A1* | 11/2003 | Sugiura | ...................... | 713/150 |
| 2004/0068655 A1* | 4/2004 | Nishimura et al. | ......... | 713/171 |
| 2004/0255138 A1* | 12/2004 | Nakae | ......................... | 713/193 |
| 2007/0143784 A1* | 6/2007 | Kubota et al. | ................ | 725/31 |

OTHER PUBLICATIONS

Easter, R.J.,Chencinski, E.W., D'Avignon, E.J., Merz, W.A., Norberg, C.D., S/390 Parallel Enterprise Server CMOS Cryptographic Coprocessor, IBM J. Res. Develop., Col. 43., No. 5/6, Sep./Oct. 1999.*

* cited by examiner

*Primary Examiner*—Christopher Revak

(57) ABSTRACT

A method is disclosed for performing cryptographic tasks, that include key setup tasks and work data processing tasks. This method comprises the steps of processing the key data in a first cryptographic engine and processing the work data in a second cryptographic engine. The processing of the key data comprises the steps of receiving key data, processing the key data, and generating processed key data. The processing of the work data comprises the steps of receiving the processed key data, receiving work data, processing the work data, and outputting the processed work data. In this method of the invention, the first cryptographic engine performs its tasks independently of the second cryptographic engine. A method for allocating cryptographic engines in a cryptographic system is also disclosed comprising monitoring a queue of cryptographic tasks, monitoring activity levels of a first allocation of a plurality of cryptographic engines, and dynamically adjusting the first allocation.

34 Claims, 15 Drawing Sheets

CRYPTOGRAPHIC KEY SETUP IN QUEUED CRYPTOGRAPHIC SYSTEMS

FIELD OF THE INVENTION

The present invention relates to the field of data encryption. More particularly, the present invention relates to the efficient execution of cryptographic tasks including key setup tasks and work data processing tasks.

BACKGROUND OF THE INVENTION

As computers become more deeply ingrained in the operations of everyday life, the need for securing information thereby becomes increasingly important. The need for confidentiality, authenticity and integrity applies to many types of information including corporate, governmental and personal information. With so much encryption necessary in everyday life it is therefore becoming necessary to perform encryption in a faster and more efficient manner.

Where a computer operates in a stand alone or client environment, cryptographic processing usually consists of a single discrete job or task, such as to encrypt data or to verify a digital signature. These jobs can occur infrequently and in a sporadic manner such that these tasks are typically not queued because there is usually a significant interval between job requests as presented to a client side cryptographic subsystem. In other words, the client environment is usually a low concurrency environment in which cryptographic tasks arrive at the cryptographic facility at a low rate. Thus, there is little or no need for queuing of tasks in this environment.

On the other hand a client-server environment can consist of high job arrival rates with the result that queues of cryptographic tasks develop waiting for service from the server cryptographic facility. A cryptographic job in a queue, usually consists of two data parts. One part of this job, the key data, has to do with setting up the keys and preparing to use them in a specific algorithm. Each algorithm has unique set up characteristics. For example, the Data Encryption Standard (DES) algorithm has different characteristics than the Advanced Encryption Standard (AES) algorithm. The second part of the job involves the work data and the actual operations an algorithm must perform on the data.

Whereas the need for cryptographic processing has increased dramatically, the development of cryptographic systems has not kept up with this need. In fact, many cryptographic systems in existence today are remnants of historically low concurrency processing environments. These subsystems have a monolithic structure in which a single cryptographic engine performs key data (i.e., key setup) and work data processing sequentially using the same engine. There is no attempt to pipeline these tasks even though they are amenable to a pipelining or look-ahead strategy.

Accordingly, there is a need to further improve the efficiency of pending cryptographic task performance. The present invention addresses this and related issues.

SUMMARY OF THE INVENTION

The present invention provides a method for performing pipelined key setup and work data processing in a cryptographic system. The cryptographic system contains a queue of jobs where the jobs include work data and key data associated with a key type. In the method of the invention, the job queue is monitored including, by looking ahead into the job queue for one or more succeeding jobs to be performed. Key set up is performed in a pipelined manner for the various jobs. The pipelined key setup is performed independently from processing of the work data for the various jobs. Although the key setup and processing of the work data are typically performed in separate cryptographic engines, when an engine used for performing key setup becomes temporarily free it can be used also for work data processing, and vice versa, in order to improve throughput. Moreover, the key setup tasks and work data processing tasks can run concurrently also improving throughput of the system. For each job, the key setup includes identifying a cryptographic algorithm for processing the work data, and further includes processing the key data from that job so as to match its key type to the algorithm. In the method of the invention, the key data is available before processing of the work data is to be performed.

Another embodiment of the invention provides a method for performing cryptographic tasks, wherein the cryptographic tasks include key setup tasks and work data processing tasks. This method of the invention comprises the steps of processing the key data in a first cryptographic engine and processing the work data in a second cryptographic engine where the first and second cryptographic engine can operate concurrently to improve throughput. The processing of the key data comprises the steps of receiving key data, processing the key data, and generating processed key data. The processing of the work data comprises the steps of receiving the processed key data, receiving work data, processing the work data, and outputting the processed work data. In this method of the invention, the first cryptographic engine performs its tasks independently of the second cryptographic engine.

In yet another embodiment of the invention, the cryptographic tasks correspond to a cryptographic algorithm such as a DES algorithm, an RSA algorithm, an AES algorithm, a Diffie-Hellman algorithm, or a knapsack algorithm. In another embodiment of the invention, the first cryptographic engine is optimized to perform tasks of the cryptographic algorithm. In yet another embodiment of the invention, the second cryptographic engine is optimized to perform tasks of the cryptographic algorithm. Also, the first cryptographic engine can perform its tasks in a pipeline with the second cryptographic engine.

In yet another embodiment, a method is described for allocating cryptographic engines in a cryptographic system. This method comprises the steps of monitoring a queue of cryptographic tasks to obtain queue information, monitoring activity levels of a first allocation of a plurality of cryptographic engines, and dynamically adjusting the first allocation. In this method of the invention each cryptographic task includes a key setup task and a work data processing task. Moreover, activity levels of the plurality of cryptographic engines are monitored in order to obtain cryptographic engine information. Also, a first set of the plurality of cryptographic engines performs key setup tasks, and a second set of the plurality of cryptographic engines performs work data processing tasks. In dynamically adjusting the first allocation, a modified first allocation of the plurality of cryptographic engines is created responsive to the queue of cryptographic tasks.

In another embodiment of the invention, the queue information includes an indication of the number of operations awaiting service, an encryption algorithm to be used, or an indication on whether keys or processed work data is to be re-used in subsequent operations. In yet another embodiment of the invention, cryptographic engine information includes information on cryptographic engine idle time or information on cryptographic engine use time. In another embodiment of the invention, dynamically adjusting the first allocation includes dynamically adjusting the first set of the plurality of cryptographic engines to create a modified first set of the plurality of cryptographic engines or dynamically adjusting the second set of the plurality of cryptographic engines to create a modified second set of the plurality of cryptographic engines.

Many other embodiments or variations are possible as will be appreciated upon an understanding of the present disclosure.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

The present invention will be described with reference to certain encryption tasks, however, one of skill in the art will understand that the teachings of the present invention are also appropriate for decryption tasks. Moreover, one of skill in the art will understand that many other related tasks are possible including translations, digital signatures, signature verifications, hashing and any combinations of such or other cryptographic operations.

Figure 1:
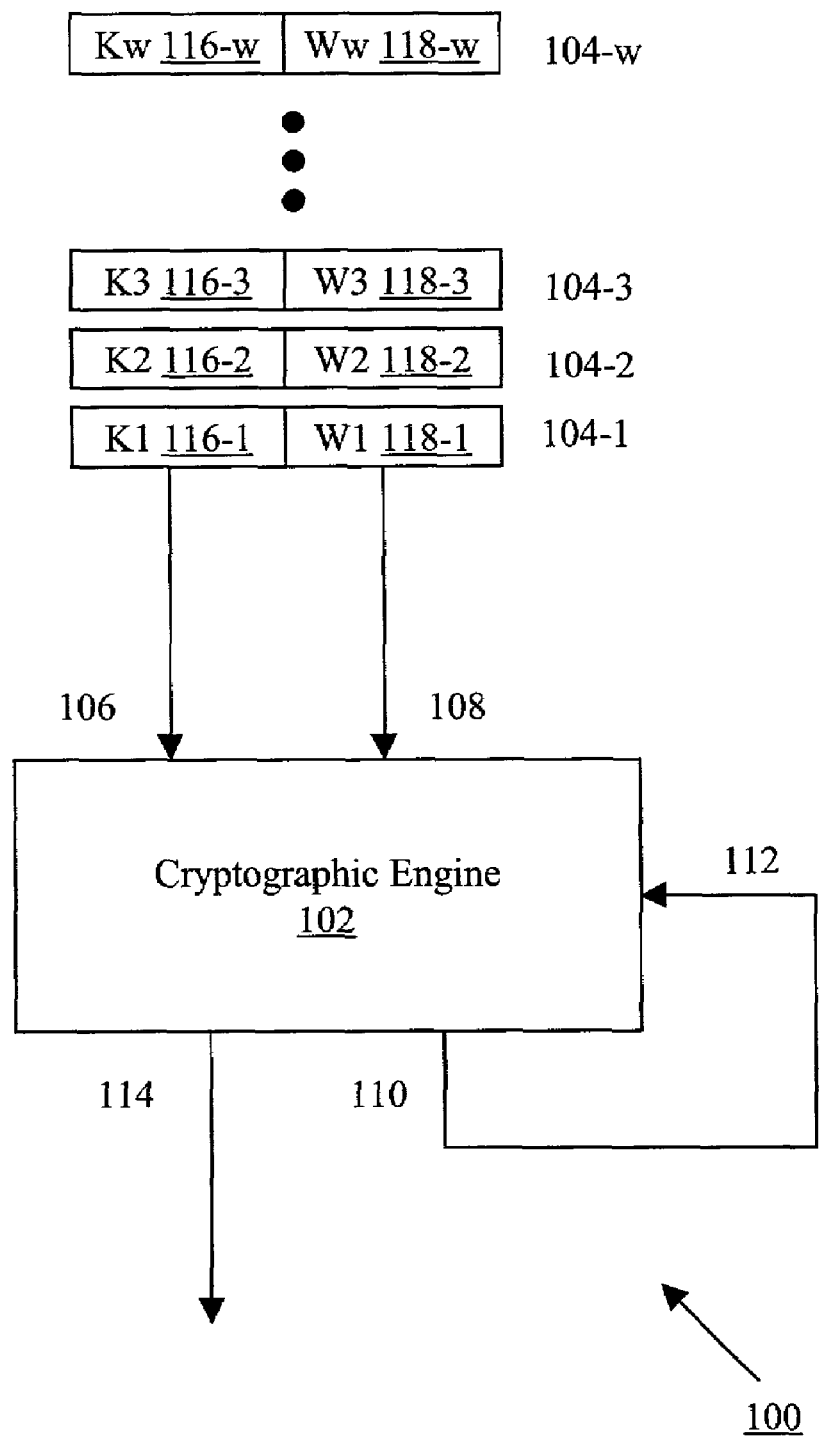
FIG. 1 is a block diagram of a cryptographic system using one cryptographic engine to process key data and work data according to the prior art.

A comparison of conventional cryptographic schemes and the present invention is helpful to understand the present invention. Shown in FIG. 1 is a block diagram of a prior art cryptographic system 100 with one cryptographic engine 102. As shown, a number of cryptographic operations 104-1 through 104-w are queued for processing by cryptographic engine 102. Cryptographic operations 104-1 through 104-w are generally divided into two segments. A first segment is a key data segment such as key data segments 116-1 through 116-w; a second segment is a work data segment such as work data segments 118-1 through 118-w. It is important to note that cryptographic operations 104-1 through 104-w can be encryption or decryption tasks both of which can be performed by cryptographic engine 102. In operation, cryptographic system 100 first processes cryptographic operation 104-1 that includes key data segment 116-1 and work data segment 118-1. In doing so, key data segment 116-1 is first received by cryptographic engine 102 for processing and outputting processed key data to output 110. In this way, a key is set up. Output 110 containing processed key data is then directed to input 112 of cryptographic engine 102 for further use by cryptographic engine 102. With this processed key data, cryptographic engine 102 can then receive work data segment 118-1 at input 108. Cryptographic engine 102 then processes work data segment 118-1 through the use of processed key data. Upon completion, processed work data is then available at output 114. Cryptographic system 100 is typically used with a microprocessor-based computer system such that output 114 can be directed to a microprocessor or memory as appropriate.

Figure 2:
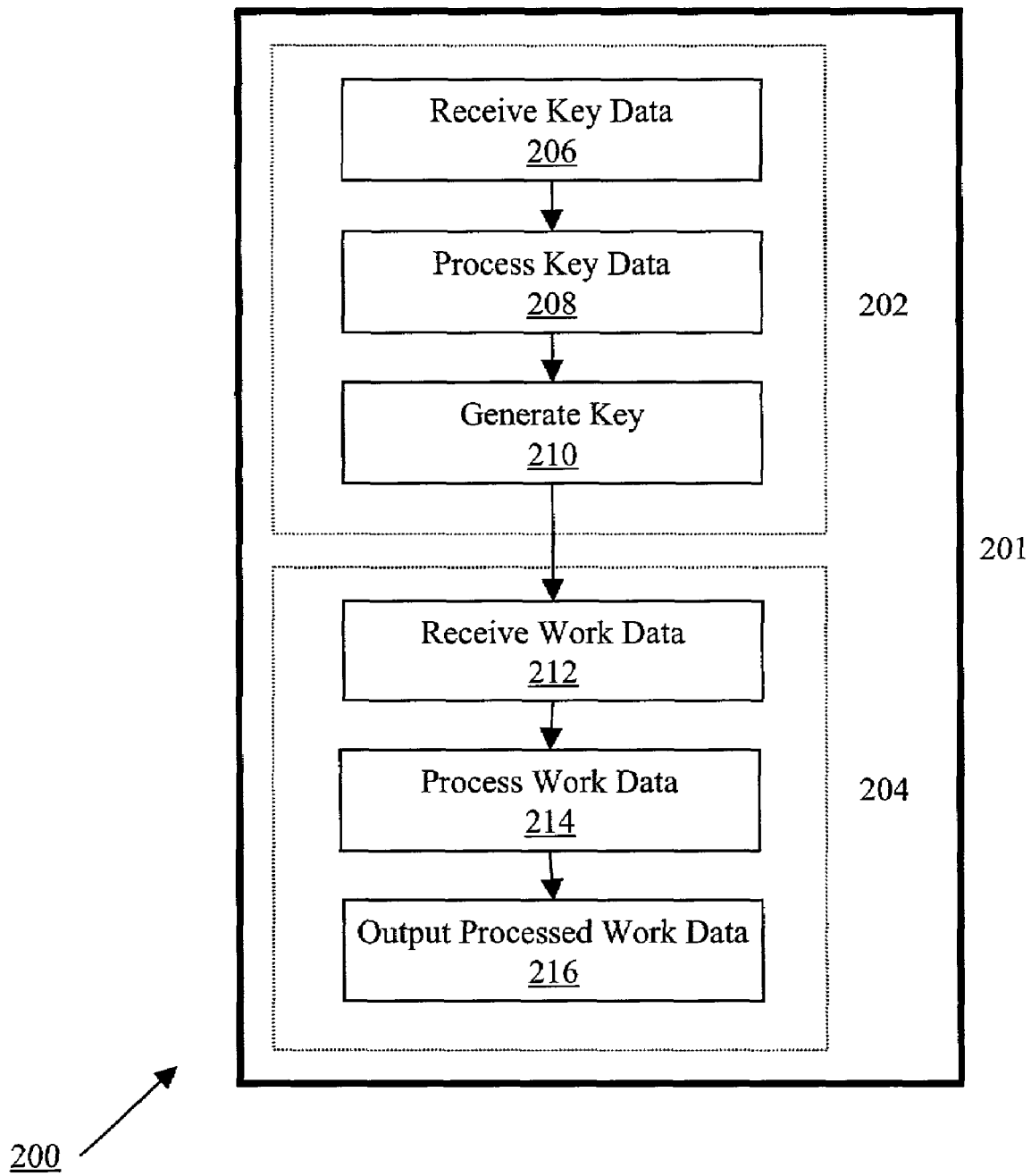
FIG. 2 is a flowchart of a method for processing key data and work data according to the prior art.

Described with reference to FIG. 1 were several steps performed by cryptographic system 100. These steps are better understood with reference to method 200 of FIG. 2. As shown in FIG. 2, steps 206 through 216 enclosed by box 201 are performed by cryptographic engine 102. The various steps of method 200 are further broken up into sections as denoted by boxes 202 and 204. As shown, steps 206 through 210 within box 202 correspond to key setup tasks and steps 212 through 216 within box 204 correspond to work data processing tasks. With reference to box 202, at step 206, cryptographic engine 102 receives key data which is then processed at step 208. Cryptographic engine 102 then generates keys at step 210. With these processed keys, cryptographic engine 102 can then proceed to process work data. At step 212, cryptographic engine 102 receives work data which is then processed at step 214 through the use of the keys. At step 216, processed work data is then output for use in other operations as known to one of skill in the art. Essentially, prior art method 200 performs steps 206 through 216 in a serial manner. Thus, the time required to perform method 200 is the sum of the time required to perform each individual step of the key setup operations of box 202 and the work data processing operations of box 204.

Whereas the prior art system 100 used one cryptographic engine for processing both key data and work data, the present invention pipelines cryptographic tasks among at least two cryptographic engines. Pipelining is an implementation technique in which multiple tasks are overlapped in execution. In the pipeline processing of the present invention, a downstream cryptographic engine need not complete processing of a first task before an upstream cryptographic engine can begin processing of a second task. That is, several tasks are executed in the pipeline simultaneously, each at a different processing stage. In the present invention, the pipeline is divided into segments where each segment can execute its operation concurrently with the other segments. When a segment completes an operation, it passes the result to the next segment in the pipeline and retrieves the next task from the preceding segment. The final results of each cryptographic task emerge at the end of the pipeline in succession.

According to the present invention, at least one cryptographic engine is designated for processing key data (i.e., key setup stage) and at least one cryptographic engine is designated for processing work data (i.e., work data processing stage). Moreover, job retrieval from a queue is also pipelined. Thus, the present invention is suitable for high performance, high arrival rate systems where fast processing of cryptographic tasks is critical. In another embodiment of the invention, when a cryptographic engine performing key setup is free, it can be used for work data processing, and vice-versa, in order to improve throughput of the system. Accordingly, the present, invention is also useful for batch processing.

Figure 3:
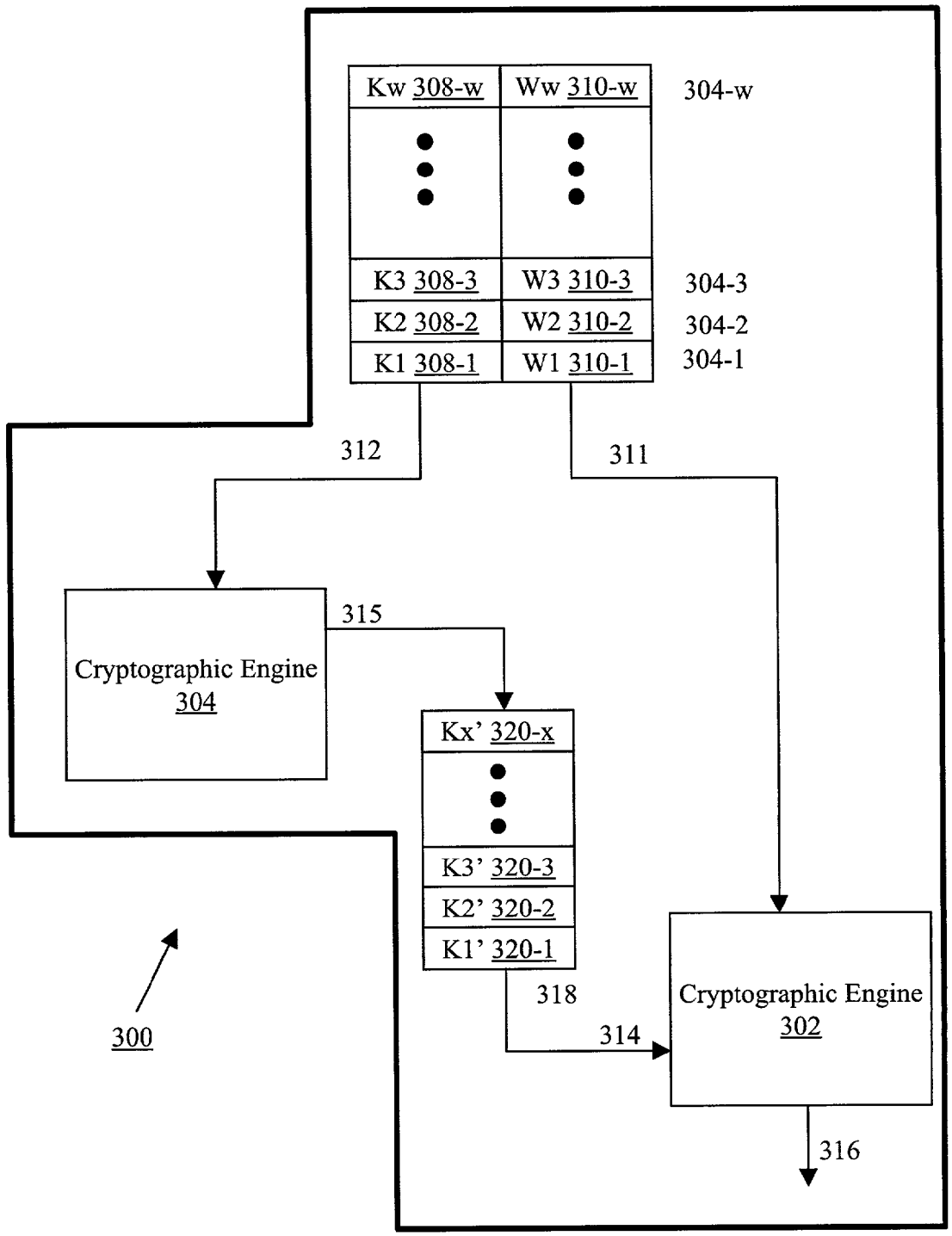
FIG. 3 is a block diagram of a cryptographic system using one cryptographic engine to process key data and another cryptographic engine to process work data according to an embodiment of the invention.

Shown in FIG. 3 is cryptographic system 300 according to an embodiment of the invention. Cryptographic system 300 includes at leant two cryptographic engines, cryptographic engine 302 for processing work data and cryptographic engine 304 for processing key data. As shown, a number of cryptographic operations 304-1 through 304-w are queued for processing by cryptographic engines 302 and 304. As described previously, cryptographic operations 304-1 through 304-w are generally divided into two segments, key data segments 308-1 through 308-w and work data segments 310-1 through 310-w. Also, it is important to note that cryptographic operations 304-1 through 304-w can be encryption or decryption tasks both of which can be performed by cryptographic engines 302 and 304. In an embodiment of the invention, cryptographic system 300 monitors and retrieves, in a pipelined manner, the queued cryptographic operations 304-1 through 304-w. In this way, cryptographic system 300 looks ahead into the job queue for one or more succeeding jobs to be performed. In monitoring the queued cryptographic operations 304-1 through 304-w, cryptographic system 300 determines the tasks to be performed by cryptographic engines 302 and 304. Among other things, cryptographic system 300 identifies a cryptographic algorithm to be used and determines whether the task to be performed is an encryption or decryption task. Thus, upon processing to key data, its key type will match that of the work data. It is important to note that cryptographic engine 304 preferably receives and processes key data segments 308-1 through 308-w (i.e., sets up keys) before cryptographic engine 302 receives and processes work data segments 310-1 trough 310-w, respectively. Hence, different stages of cryptographic processing arc performed at the different stages of the pipeline. For any queued cryptographic operation it is necessary that the key data segment (e.g., 308-1) be processed (i.e., a key must first be set up for the proper cryptographic algorithm) before the work data segment (e.g., 310-1) can be processed. whether cryptographic engine 304 processes key data segments 308-1 through 308-w Just before they are needed or significantly before they are needed does not matter for the purposes of cryptographic engine 302. Memory unit 318 is provided for storage of processed cryptographic keys K1' 320-1 through Kx' 320-x. As key data is processed by cryptographic engine 304, such processed data is stored in memory unit 318 for access by cryptographic engine 302 prior to processing corresponding work data. By setting up keys ahead of time, there can be substantially zero latency between the various work data processing tasks performed by cryptographic engine 302.

As an example, consider cryptographic operation 304-2 and assume that cryptographic engine 302 is presently busy with operations related to cryptographic operation 304-1 and, in particular, work data segment 310-1. In order for cryptographic engine 302 to be most efficient, it must immediately have available processed key data segment 308-2 when it is ready to process work data segment 310-2 Accordingly, an embodiment of the invention monitors the queue of cryptographic operations 304-1 through 306-w to extract key data segments 308-1 through 308-w in an ahead-of-time basis. In the example being described, while cryptographic engine 302 is busy with operations related to cryptographic operation 304-1 and, in particular, work data segment 310-1, cryptographic engine 304 receives at input 312 at least key data segment 308-2 which is then processed by cryptographic engine 304 and directed to output 315 for storage in memory unit 318. Cryptographic engine 304 in conjunction with memory unit 318, therefore, makes available processed key data to cryptographic engine 302 at input 315 with substantially reduced latency. Thus, when cryptographic engine 302 finishes operations related to cryptographic operation 304-1 and, in particular, work data segment 310-1, cryptographic engine 302 can immediately receive at input 311 information related to cryptographic operation 304-2. Importantly, cryptographic engine 302 can immediately receive at input 311 work data segment 310-2 because cryptographic engine 304 has already processed key data segment 308-2 and memory unit 318 has made available such processed information at input 314. Advantageously, where cryptographic engine 304 processes key data segments 308-1 through 308-w in an ahead-of-time basis, the throughput of cryptographic system 300 is substantially determined by the processing of work data segments 310-1 Through 310-w by cryptographic engine 302.

In another embodiment of the invention, processed keys are retained in memory unit 318 for multiple instances of the same cryptographic algorithm. This can occur when processing information from the same client. For example, where a client is a bank, it may make many requests to process automatic teller machine (ATM) information. Because such information is typically encrypted using the same algorithm, it can be efficient to store and retain processed keys corresponding to such a client. Thus, subsequent processing of the same key data can be avoided. In an embodiment of the invention, processed keys in memory unit 318 are tagged with a handle or pointer for fast retrieval by a cryptographic engine 302. In yet another embodiment of the invention, processed keys are also retained for bulk encryption or decryption of large amounts of work data. For example, where a client is a digital movie provider, a two-hour movie provides a very large amount of work data that is typically encrypted with the same encryption algorithm and encryption key. Thus, memory unit 318 stores and retains processed keys at least until all the movie data is processed by cryptographic engine 302. In this manner, keys need not be processed many times for the large amount of work data. Moreover, these large amounts of work data can be simultaneously processed by separate cryptographic engines. This will be further discussed with reference to FIGS. 8A and 8B.

Figure 4A:
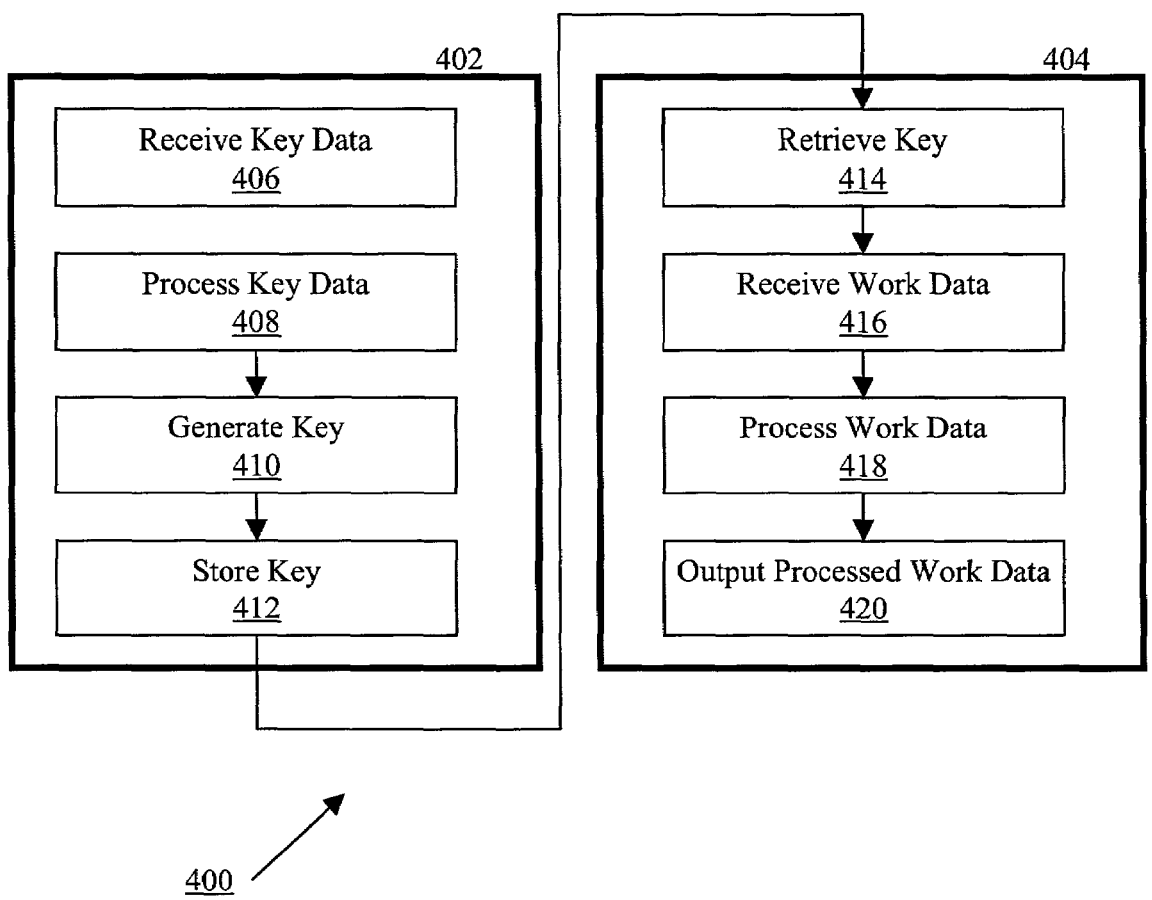
FIG. 4A is a flowchart of a method for processing key data on one cryptographic engine and work data on another cryptographic engine according to an embodiment of the invention.

The present invention can further be understood with reference to method 400 of FIG. 4A. Boxes 402 and 404 are shown to indicate the steps performed by cryptographic engine 304 and 302 (FIG. 3), respectively. Moreover, box 402 corresponds to key data processing and box 404 corresponds to work data processing. As shown, key data processing steps 406 through 412 are performed by cryptographic engine 304 and work data processing steps 414 through 420 are performed by cryptographic engine 302. At step 406, cryptographic engine 304 receives key data which is then processed at step 408. Cryptographic engine 304 generates keys at step 410 and stores such keys at step 412. With processed key data, cryptographic engine 302 can then process work data. At step 414, cryptographic engine 302 retrieves stored keys and at step 416 cryptographic engine receives work data. Using the keys, the work data is then processed at step 418. At step 420, processed work data is output for use in other operations as known to one of skill in the art. Essentially, method 400 of the present invention performs key data processing and work data processing in a pipelined manner. Where steps 406 through 412 of box 402 are performed by cryptographic engine 304 in an ahead-of-time basis, the throughput of the cryptographic system is substantially determined by the time required to perform steps 414 through 420 of box 404 by cryptographic engine 304.

In an embodiment of the invention, processing of work data takes longer to perform than processing of key data. In another embodiment of the invention, however, the processing of key data takes longer to perform than processing of work data. In this latter embodiment, the throughput is essentially determined by the time required to process key data. Even in this embodiment, key setup and work data processing tasks are performed in a pipeline and overlap in time such that the throughput of the system is dramatically improved.

Figure 4B:
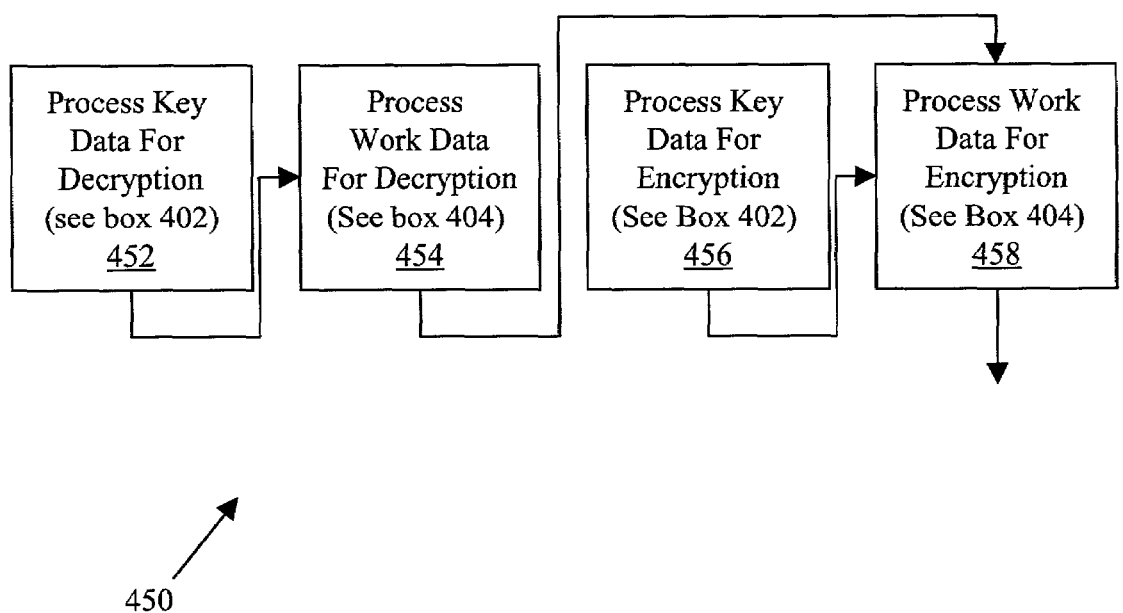
FIG. 4B is a flowchart of a method for processing information corresponding to a first cryptographic algorithm and then further processing the information according to a second cryptographic algorithm according to an embodiment of the invention.

In yet another embodiment of the invention, the method 400 of FIG. 4A is performed once for a first encryption scheme and then applied a second time for a second encryption scheme. For example, method 400 can be performed once to decrypt a message encrypted in a DES scheme and then method 400 can be performed again to encrypt a message in an RSA scheme. Shown in FIG. 4B is a method 450 for efficiently decrypting information and then subsequently encrypting the decrypted information. At step 452, key data is processed for the encrypted information where the information is decrypted using a first cryptographic algorithm. Step 452 corresponds to the key setup steps described with reference to box 402 of FIG. 4A. At step 454, work data is processed to decrypt the information using processed keys from step 452. Step 454 corresponds to the work data processing steps described with reference to box 404 of FIG. 4A. Key data is processed for the encryption of information at step 456. Using the decrypted information of step 454 and the processed key of step 456, the information is then encrypted using a second cryptographic algorithm at step 458. Steps 456 and 458 correspond to the steps of boxes 402 and 404, respectively. Through pipelining of cryptographic tasks and queuing as described previously, the throughput of method 450 provides improvement over the prior art that would have performed any tasks in a serial manner.

Figure 5A:
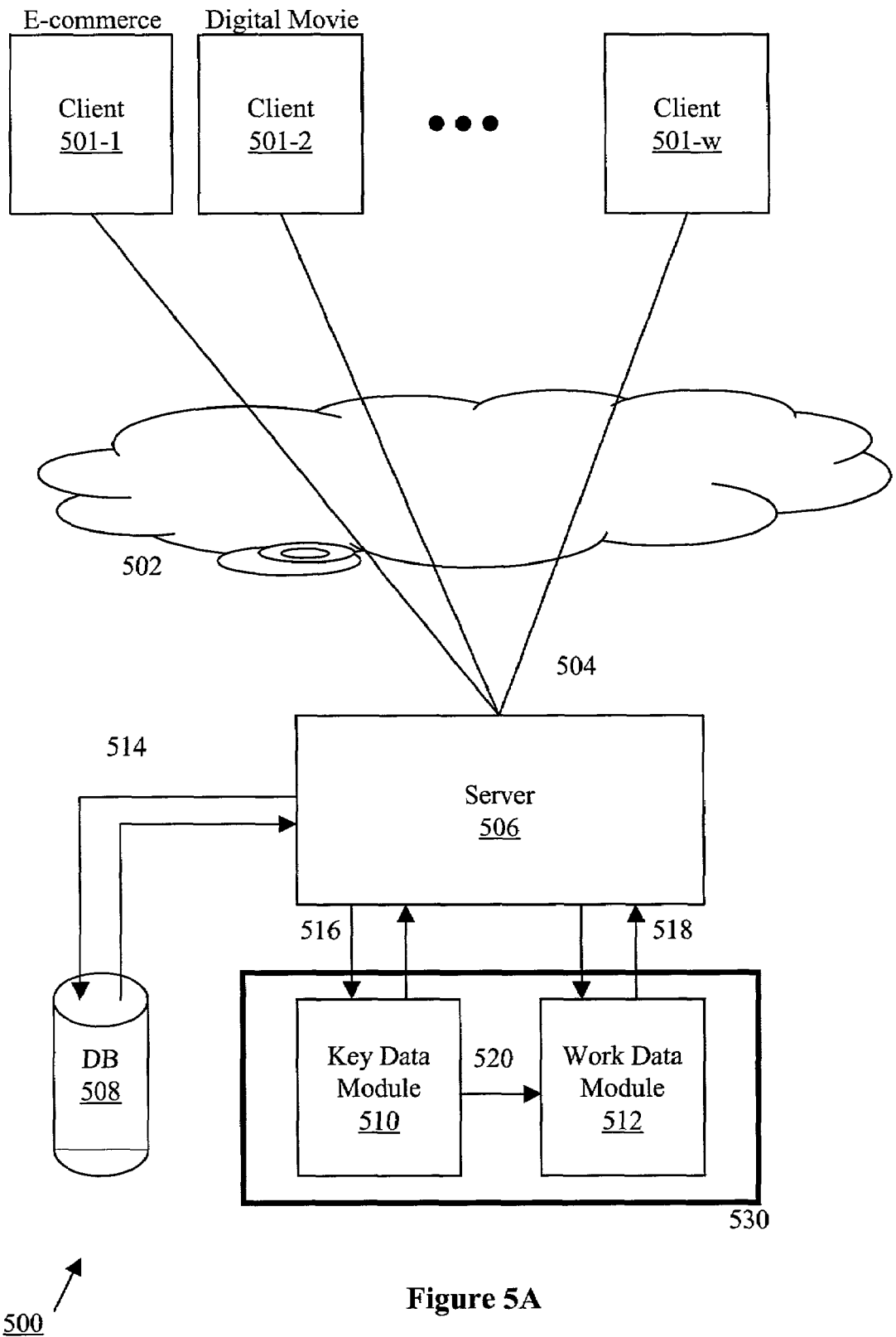
FIG. 5A is a block diagram of a client-server computer system implementing independent key processing and work data processing according to an embodiment of the invention.

The teachings of the present invention are appropriate for use with a microprocessor-based computer system. FIG. 5A is a block diagram of a system 500 according to an embodiment of the invention. As shown, server 506 is a microprocessor-based computer system with memories of various forms which may include RAM, ROM or magnetic media. Server 506 is communicatively coupled to clients 501-1 through 501-w through network 502 such as the Internet or an area network. Client 501-1 is illustrated as an e-commerce client and client 501-2 is illustrated as a digital movie subscriber client. As known in the art, clients can take many other forms which are, nonetheless, appropriate for use with the teachings of the present invention. In an embodiment, server 506 is connected to database 508 for storing key information. Further connected to server 506 is key data module 510 and work data module 512. Key data module 510 is configured to contain at least one cryptographic engine similar in operation to cryptographic engine 304 of FIG. 3. Moreover, work data module 512 is configured to contain at least one cryptographic engine similar in operation to cryptographic engine 302 of FIG. 3. It should be noted that server 506 and clients 501-1 through 501-w can be configured as known in the art to include input devices (e.g., mouse and keyboard) and output devices (e.g., display and printer) along with the above-described microprocessor and memory.

With reference to FIG. 5A, clients 501-1 through 501-w present tasks including cryptographic tasks to server 506. Where cryptographic tasks are involved, server 506 is configured to pass such tasks to key data module 510 and work data module 512. In an embodiment of the invention, server 506 maintains a database 508 on which it stores certain key information necessary for encryption or decryption tasks to be performed by key data module 510 and work data module 512. Thus, upon receiving a cryptographic task from clients 501-1 through 501-w, server 506 retrieves appropriate key information from database 508 and passes such information to key data module 510 or work data module 512 as appropriate. Cryptographic tasks presented by clients 501-1 through 501-w are maintained in a cryptographic queue within system 500. Such cryptographic queue is as was described with reference to FIGS. 3 and 4. Key data is passed through interface 516 to be received by key data module 510. Separately, work data is passed through interface 518 to work data module 512. Key data module 510 is configured to process key data in an ahead-of-time basis and to make such information available to work data module 512 at interface 520. Where key data and work data are independently processed, the time required to process cryptographic tasks is substantially reduced.

A queue of cryptographic tasks can develop within server 506 in various situations. This occurs, for example, where server 506 is connected to many clients 501-1 through 501-w, many of such clients may direct cryptographic tasks discretely or in batches to server 506. Substantially concurrently, where the multiple cryptographic tasks require processing, a queue of cryptographic tasks is created. Sending a batch of cryptographic tasks by a client may be desirable because it may provide efficiencies in transmission. For example, it may be much more efficient to send 100 cryptographic tasks in a batch than to serially send each cryptographic task one at a time. This can be especially significant where the digital information corresponding to the cryptographic task is of the order of the digital overhead for sending information. Overhead can be in the form of header and footer information in a digital message that must be included with each message.

As shown in FIG. 5A, key data module 510 and work data module are within security boundary 530. The limits of security boundary 530 are generally defined by units that process or maintain unencrypted key information. As shown with reference to FIG. 5A, key data module 510 and work data module 512 maintain and use unencrypted key information. Accordingly, they are within security boundary 530. To assure high security of system 500, all units within security boundary 530 must be secured from tampering. For example, security boundary 530 may be contained within a tamper proof box or within a tamper proof circuit. Moreover, any time key information resides outside of security boundary 530, such key information must be encrypted. For example, where certain key information is stored in database 508, it must be encrypted. When encrypted key information is passed to server 506 it must remain encrypted because server 506 is also outside security boundary 530. Only when encrypted key information is passed within security boundary 530 can it be decrypted.

Figure 5B:
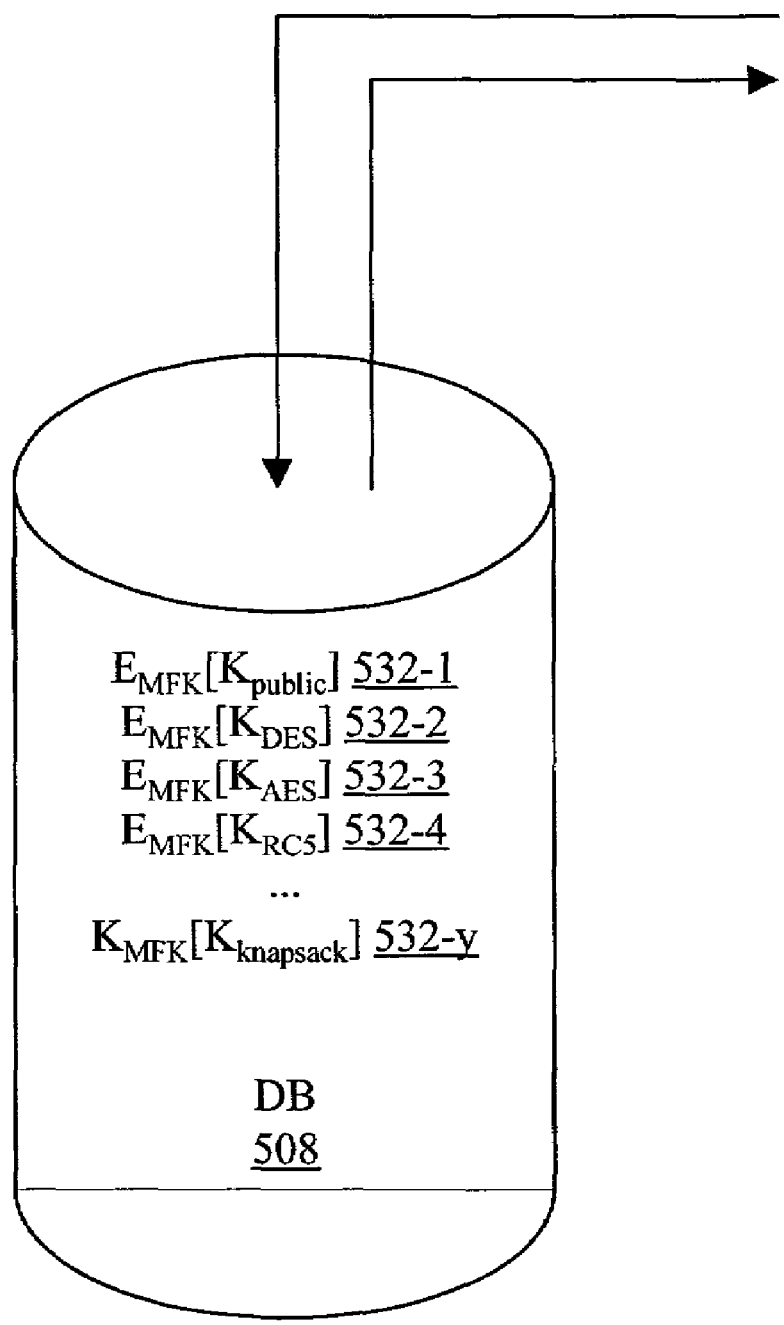
FIG. 5B is a block diagram of a database implementing a master file key according to an embodiment of the invention.

In an embodiment of the invention shown in FIG. 5A, a predetermined encryption key, called a master file key (MFK), is applied to key information outside of security boundary 530. The master file key can be any convenient and secure encryption scheme such as the Advanced Encryption Standard (AES) or the Data Encryption Standard (DES). Thus, when storing key information in database 508, the master file key is applied to the stored keys. Shown in FIG. 5B is database 508 depicting the storage of various encrypted keys 532-1 through 532-y. For example, a public encryption key, $K_{public}$, is encrypted with the master file key (MFK) to generate the encrypted key $E_{MFK}[K_{public}]$ 532-1. Other keys are similarly encrypted and stored in database 508. When retrieved from database 508 and passed within security boundary 530, the encrypted keys must first be decrypted prior to use, for example, by key data module 510.

Figure 6:
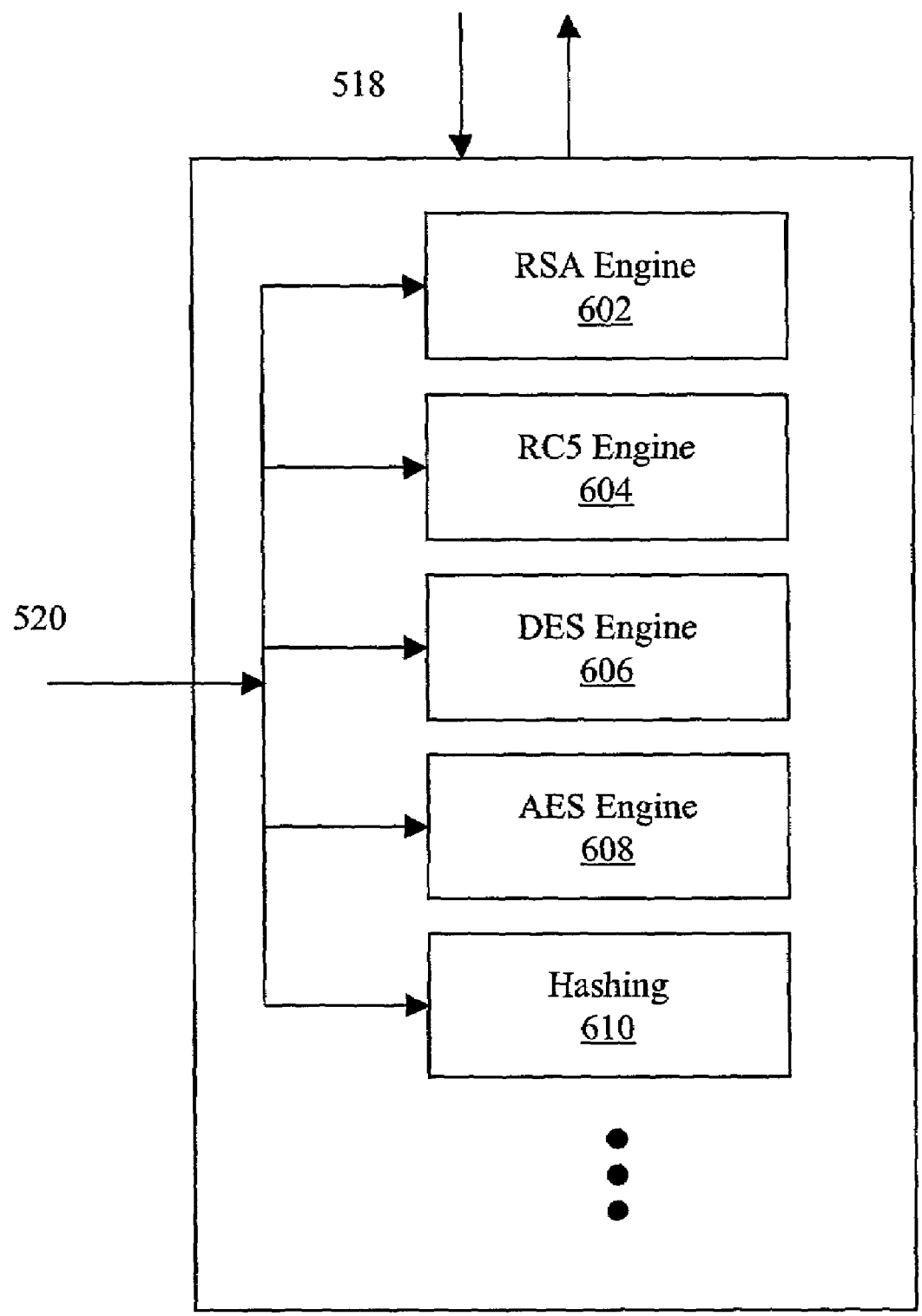
FIG. 6 is a block diagram of a work data module implementing various cryptographic engines according to an embodiment of the invention.

In another embodiment of the invention, work data module 512 is configured with a plurality of cryptographic engines. In yet another embodiment, work data module 512 is configured with a plurality of cryptographic engines optimized to perform work data operations related to identified encryption schemes. For example, as shown in FIG. 6, work data module 512, analogous in operation to work data module 512 of FIG. 5A, can be configured with a predetermined number cryptographic engines—five cryptographic engines are shown. Shown in FIG. 6 is work data module 512 configured with RSA engine 602, RC5 engine 604, DES engine 606 and AES engine 608. Moreover, work data module 512 is shown with an hashing engine 610 for use by various encryption schemes. Thus, as various encryption tasks of a certain encryption scheme are received by work data module 512, such tasks are directed to the appropriately optimized cryptographic engine. Work data module 512 of FIG. 6 is thus a specialized variation of work data module 512 of FIG. 5A. Moreover, interfaces 520 and 518 of FIG. 6 are also similar to those of FIG. 5A.

Figure 7:
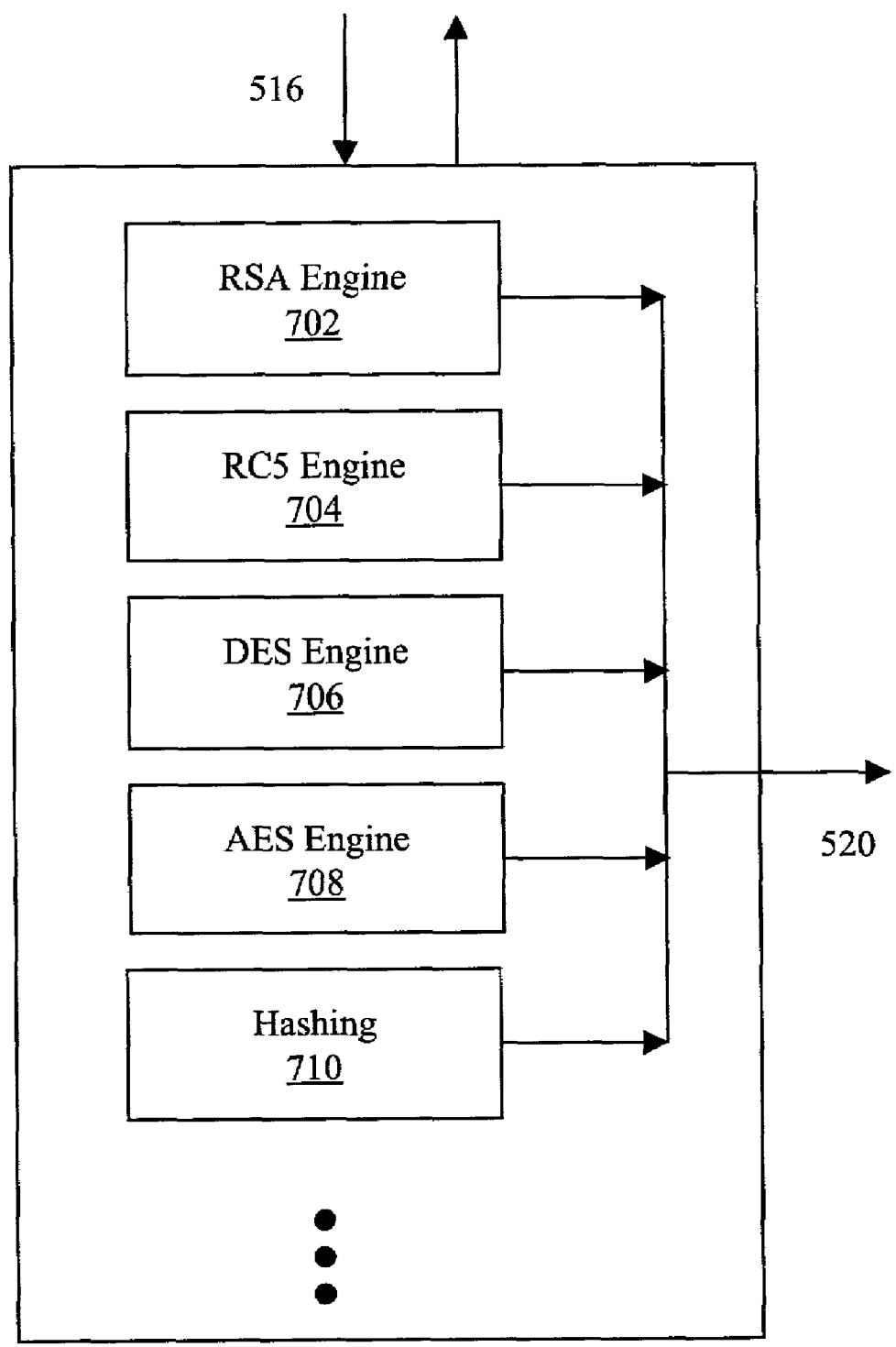
FIG. 7 is a block diagram of a key data module implementing various cryptographic engines according to an embodiment of the invention.

In another embodiment of the invention, key data module 510 is also configured with a plurality of cryptographic engines. Moreover, in an embodiment, key data module 510 is configured with a plurality of cryptographic engines optimized to perform key setup operations related to certain identified encryption schemes. For example, as shown in FIG. 7, key data module 510, analogous in operation to key data module 510 of FIG. 5A, can be configured with a predetermined number of cryptographic engines—five cryptographic engines are shown. Shown in FIG. 7 is key data module 510 configured with RSA engine 702, RC5 engine 704, DES engine 706, AES engine 708, and hashing engine 710. Thus, as various encryption tasks of a certain encryption scheme are received by key data module 510, such tasks are directed to the appropriately optimized cryptographic engine. Interfaces 516 and 520 of FIG. 7 are similar to those of FIG. 5A.

Figure 8A:
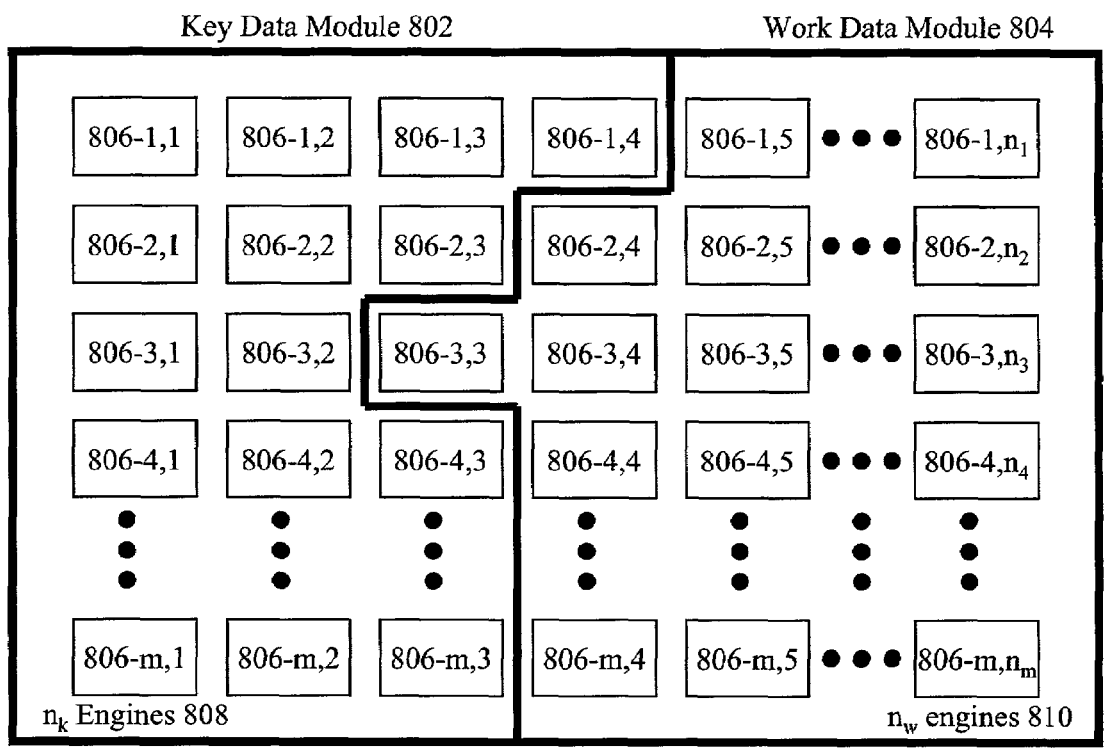
FIG. 8A is a block diagram of a collection of cryptographic engines to be shared between key setup tasks and work data processing tasks according to an embodiment of the invention.

In another embodiment of the invention, a plurality of cryptographic engines are made available that can be dynamically allocated to perform either key setup tasks or work data processing tasks. As shown in FIG. 8A, key/work data module 800 is shown as a block diagram. Key/work data module 800 includes a number, n, of cryptographic engines which are dynamically allocated between key data module 802 and work data module 804. As shown, the set of n cryptographic engines is divided into a first set 808, $n_k$, and a second set 810, $n_w$, of cryptographic engines. The first set 808, $n_k$, of cryptographic engines is allocated to perform key setup tasks as described for key data module 510 of FIGS. 5A and 7. Moreover, the second set 810, $n_w$, of cryptographic engines is allocated to perform tasks related to work data processing as described for work data module 512 of FIGS. 5A and 6. The allocation of the first set 808 and second set 810 of cryptographic engines is preferably performed responsive to a queue of tasks as described with reference to FIG. 3 and FIG. 5A. By monitoring the queue of tasks, an assessment can be made as to how the allocation of the sets $n_k$ and $n_w$ can be dynamically adjusted so as to reduce the throughput time of a cryptographic system such as system 300 and 500 of FIGS. 3 and 5, respectively.

As an example of dynamic allocation, assume a first set 808, $n_k$, of cryptographic engines is allocated to key setup tasks and a second set 810, $n_w$, of cryptographic engines is allocated to work data processing tasks. Further assume that in a scenario, upon monitoring the queue of tasks, it is observed that the first set 808, $n_k$, of cryptographic engines is often idle because all key data in the queue of cryptographic operations has been processed. Moreover, if it is observed that the second set 810, $n_w$, of cryptographic engines is continuously busy with many cryptographic operations waiting for processing of their work data. In this situation, allocation of cryptographic engines can be dynamically changed to increase the number of cryptographic engines associated with work data module 804 thus creating a modified second set 810', $n_w'$, of cryptographic engines. Correspondingly, the number of cryptographic engines associated with key data module 802 is decreased creating a modified first set 808', $n_k'$, of cryptographic engines. Dynamic allocation of cryptographic engines can also be made responsive to estimates of the amount of time required to process key data and work data. For example, where key data and work data is expected to take about the same time, cryptographic engines can be allocated equally between key data module 802 and work data module 804. Also, where key data processing or work data processing is expected to take different amounts of time, the allocation of cryptographic engines can be made accordingly.

Figure 8B:
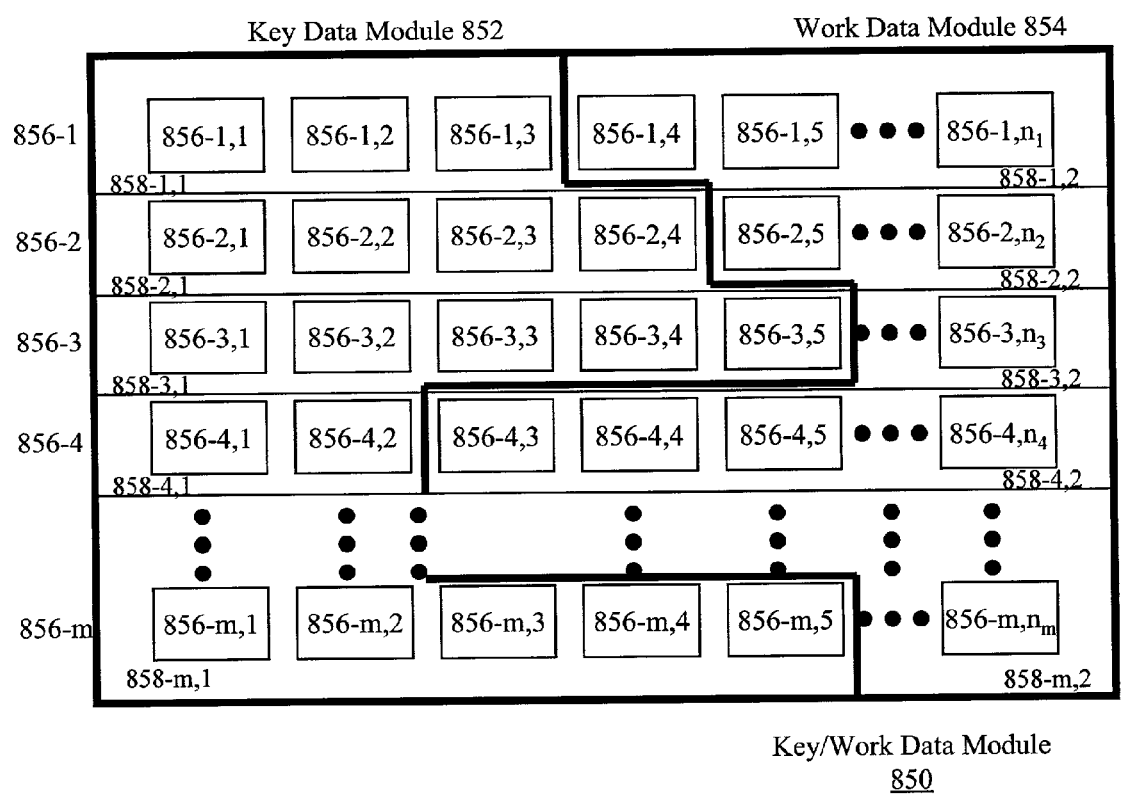
FIG. 8B is a block diagram of a collection of cryptographic engines to be shared between key setup tasks and work data processing tasks, wherein groups of cryptographic engines are optimized to perform tasks associated with identified cryptographic schemes, according to an embodiment of the invention.

In yet another embodiment of the invention, various groups of cryptographic engines are provided. In such an embodiment, the groups of engines can be specially selected to perform tasks associated with identified cryptographic schemes. FIG. 8B shows a key/work data module 850 that includes a plurality of groups of cryptographic engines. Cryptographic engines of key/work data module 850 are divided into key data module 852 and work data module 854. As shown the collection of cryptographic engines is shown structured as a grid. This is done for the purposes of describing the present invention, but is not necessary in application. Upon understanding the present disclosure, one of skill in the art will understand how to implement a grid of cryptographic engines or more generally any collection of cryptographic engines.

As shown in FIG. 8B, each row 856-1 through 856-m of the collection of cryptographic engines 850 can be designated for performing a particular encryption scheme. For example, row 856-1 can perform AES tasks, row 856-2 can perform RC5 tasks, row 856-3 can perform DES tasks, row 856-4 can perform knapsack tasks, and row 856-m can perform Diffie-Hellman tasks. Moreover, each row 856-1 through 856-m has an associated number of row elements corresponding cryptographic engines (e.g., row elements 856-1,1 through 856-1,$n_1$ for row 856-2 and row elements 856-2,1 through 856-2,$n_2$ for row 856-2). In an embodiment of the invention, the number of row elements $n_1$ through $n_x$ are equal, and in yet another embodiment of the invention, each of the number of row elements n1 through nx are distinct. As described previously, for an encryption scheme, certain key setup tasks must be performed along with certain work data processing tasks. Accordingly, for an encryption scheme, each row 856-1 through 856-m is divided into first sets of cryptographic engines allocated to key setup tasks (e.g., set 858-1,1 includes row elements 858-1,1 through 858-1,3 for row 856-1) and second sets of cryptographic engines allocated to work data processing tasks (e.g., set 858-2,1 includes row elements 858-1,4 through 858-l,$n_1$ for row 856-1).

Previously described with reference to FIG. 8A was dynamic allocation of cryptographic engines between key setup tasks and work data processing tasks. With reference to FIG. 8B dynamic allocation is also appropriate such that for a row 856-1 through 856-m, the numbers of cryptographic engines associated with key setup tasks and work data processing tasks is dynamically allocated responsive to information from the queue of cryptographic operations. In this embodiment of the invention, the queue of cryptographic operations is monitored for tasks associated with the various encryption schemes in use. For example, where row 856-1 is dedicated to AES encryption, the queue of cryptographic operations is monitored for AES cryptographic operations. Moreover, the row 856-1 of AES cryptographic engines 856-1,1 through 856-1,$n_1$ are dynamically allocated between a first set 858-1,1 of cryptographic engines dynamically allocated to process key setup tasks and a second set 858-2,2 of cryptographic engines dynamically allocated to process work data processing tasks. Similarly, each row 856-1 through 856-m can also be dynamically allocated upon monitoring the queue of cryptographic tasks corresponding to the respective encryption scheme.

Figure 9A:
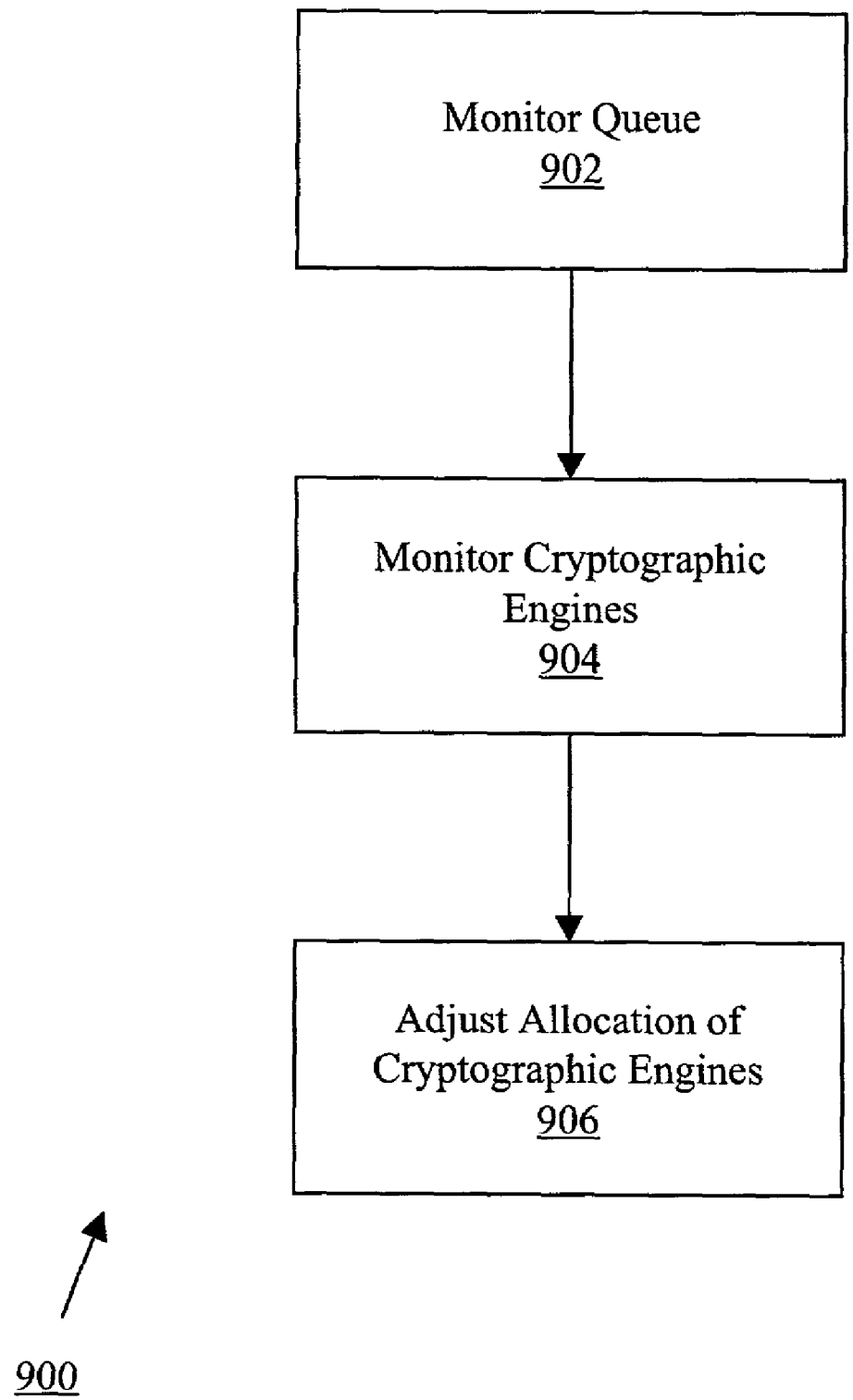
FIG. 9A is a flowchart of a method for dynamically allocating cryptographic engines according to an embodiment of the invention.

Shown in FIGS. 9A through 9D are flowcharts for various methods for dynamic allocation of cryptographic engines according to the present invention. Shown in FIG. 9A is a general method 900 for dynamic allocation of cryptographic engines according to an embodiment of the invention. At step 902, a queue of cryptographic information awaiting to be serviced is monitored. Monitor information can include the number of operations awaiting service, the encryption scheme to be used, and an indication of whether processed work data and/or keys (produced by the key setup tasks) are to be reused on other cryptographic operations. Moreover, at step 904 a plurality of cryptographic operations are monitored. Monitoring information can include latency time or a ratio of idle to in-use time. An allocation of cryptographic engines is dynamically allocated at step 906 responsive to information obtained at steps 902 and 904. Dynamic allocation can affect key setup engines as well as work data processing engines.

Figure 9B:
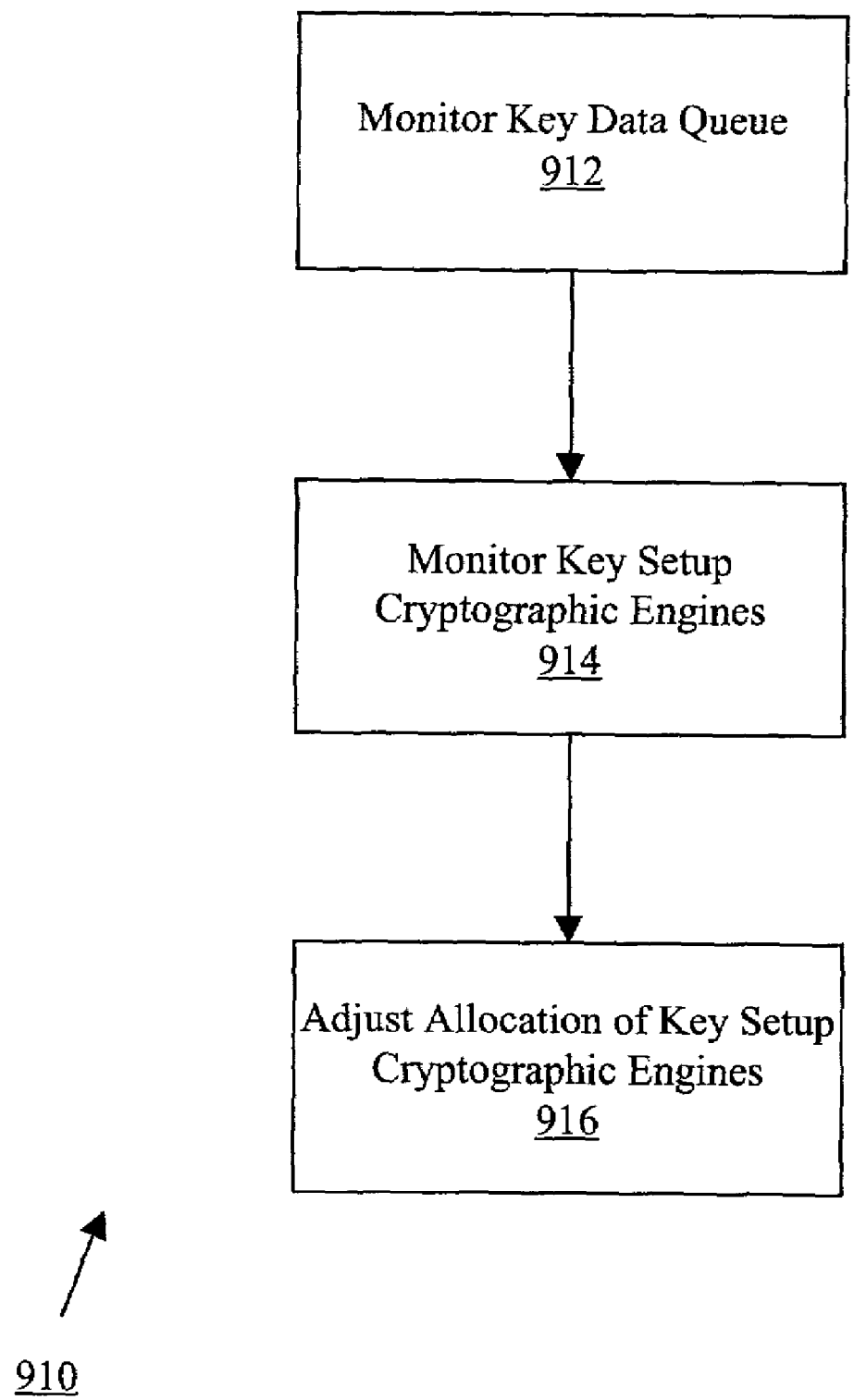
FIG. 9B is a flowchart of a method for dynamically allocating cryptographic engines used to perform key setup tasks according to an embodiment of the invention.

Shown in FIG. 9B is a method for dynamic allocation of key setup engines according to an embodiment of the invention. At step 912, a queue of cryptographic information awaiting to be serviced is monitored for factors affecting key setup tasks. Information gathered at step 912 can be similar to that gathered at step 902 of FIG. 9A and relating to key setup tasks. Returning to FIG. 9B, at step 914, a plurality of cryptographic engines are monitored for factors affecting key setup tasks. Information gathered at step 914 can be similar to that gathered at step 904 of FIG. 9A and relating to key setup tasks. An allocation of key data cryptographic engines is dynamically adjusted at step 916 responsive to information obtained at step 912 and 914.

Figure 9C:
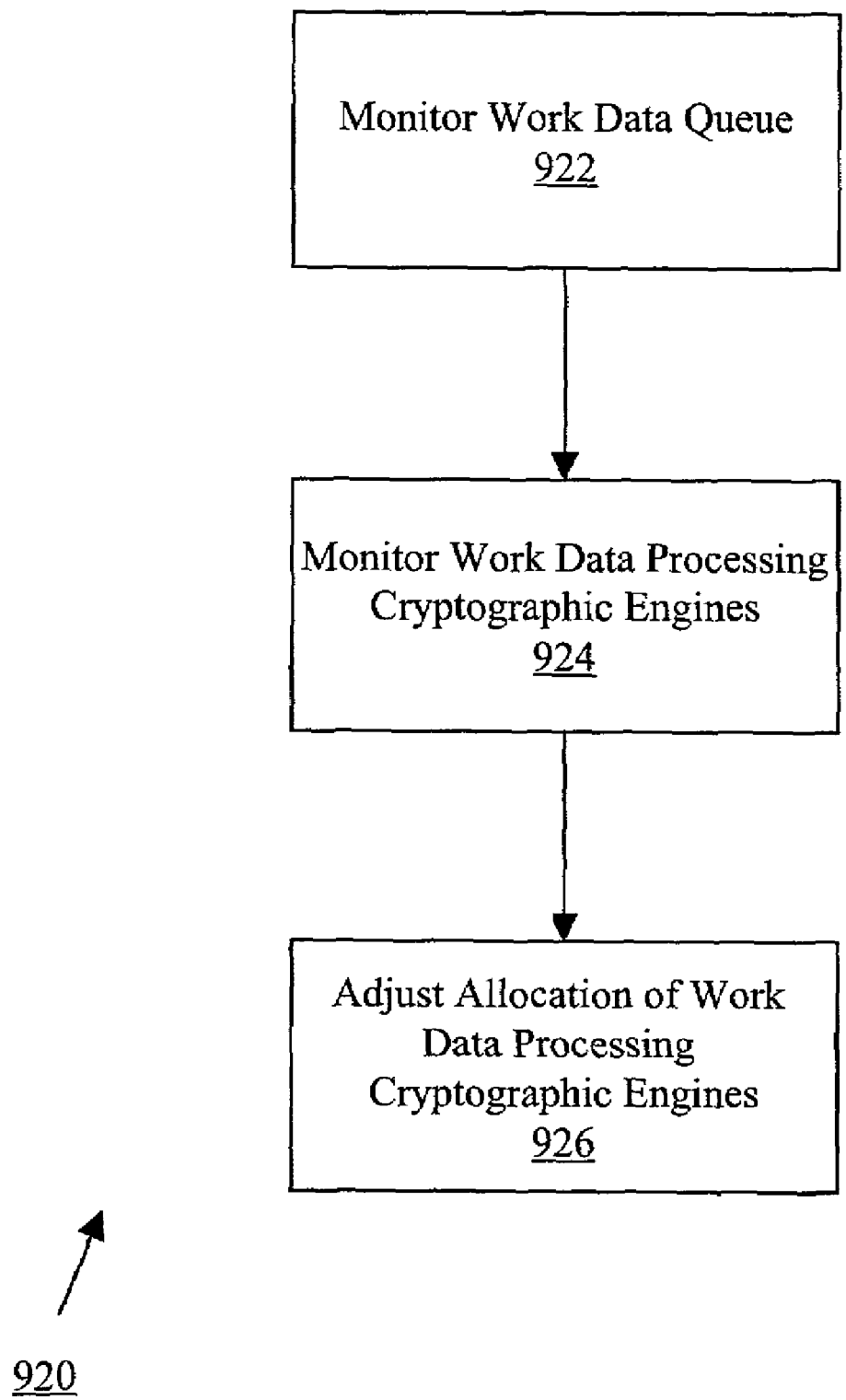
FIG. 9C is a flowchart of a method for dynamically allocating cryptographic engines used to perform work data processing tasks according to an embodiment of the invention.

A corresponding method 920 is shown in FIG. 9C for dynamic allocation of work data processing engines according to an embodiment of the invention. At step 922, a queue of cryptographic information awaiting to be serviced is monitored for factors affecting work data processing tasks. Information gathered at step 922 can be similar to that gathered at step 902 and 912 of FIG. 9A and 9B, respectively, and relating to work data processing tasks. At step 924 of FIG. 9C, a plurality of cryptographic engines are monitored for factors affecting work data processing tasks. Information gathered at step 924 can be similar to that gathered at step 904 and 914 of FIGS. 9A and 9B and relating to work data processing tasks. An allocation of key data cryptographic engines is dynamically adjusted at step 926 responsive to information obtained at step 922 and 924.

Figure 9D:
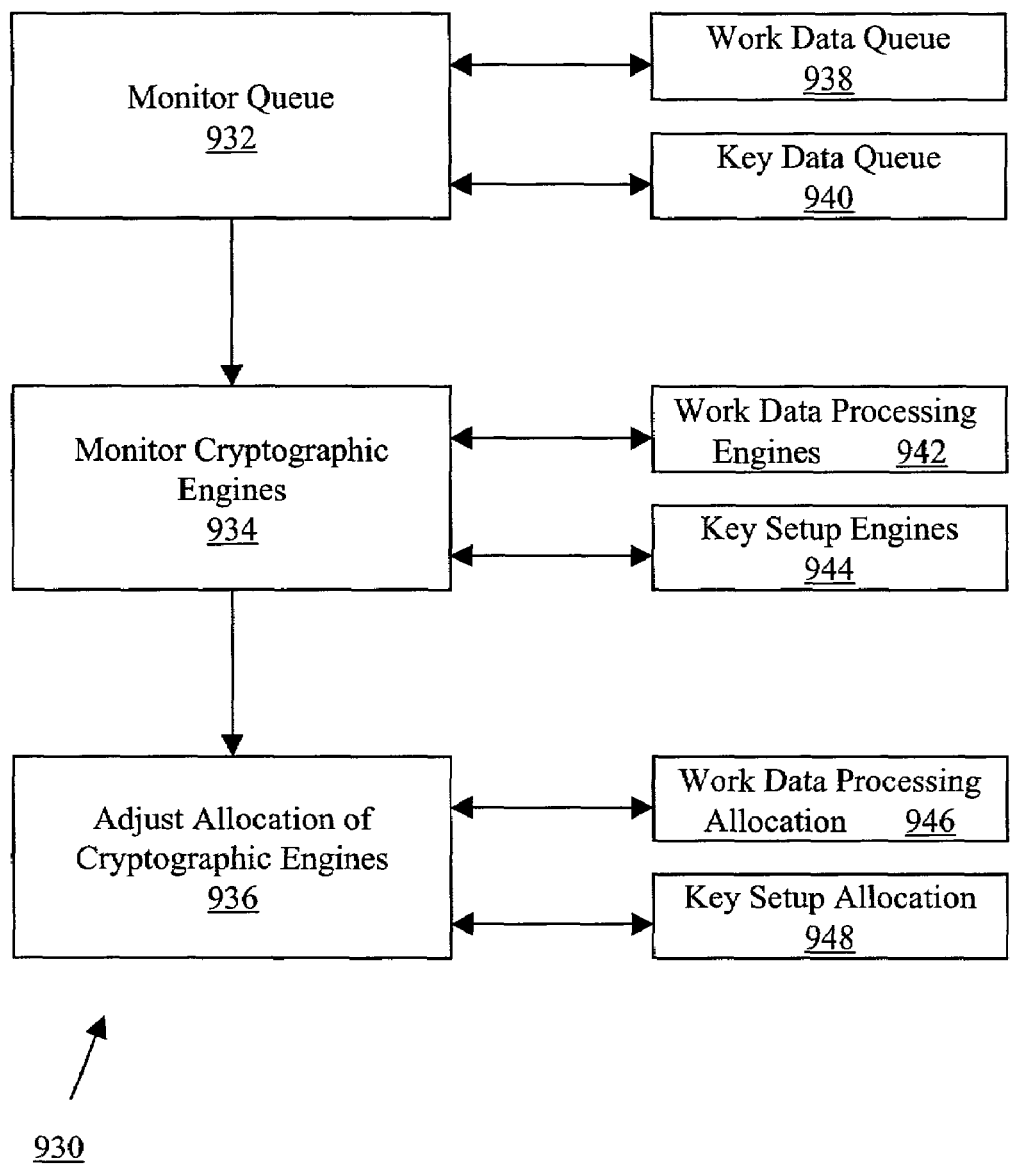
FIG. 9D is a flowchart of a method for dynamically allocating cryptographic engines between key setup tasks and work data processing tasks according to an embodiment of the invention.

Shown in FIG. 9D is a modified general method 930 for dynamic allocation of cryptographic engines corresponding to key setup tasks and work data processing tasks according to an embodiment of the invention. At step 932, a queue of cryptographic information awaiting to be serviced is monitored. As part of the monitoring of step 932, a work data queue 938 and key data queue 940 are monitored. Monitor information can include the number of operations awaiting service for key data modules and work data modules, the encryption scheme to be used, and an indication of whether work data or key data information is to be reused on other cryptographic operations. Moreover, at step 934 a plurality of cryptographic operations are monitored. As part of the monitoring of step 934, work data processing engines 942 and key setup engines 944 are monitored. Monitoring information can include latency time or a ratio of idle to in-use time. Cryptographic engines are then dynamically allocated at step 936 responsive to information obtained at steps 932 and 934. Dynamic allocation includes work data allocation 946 and key data allocation 948.

Several preferred embodiments of the present invention have been described. Nevertheless, it will be understood that various other modifications may be made to the described invention without departing from its spirit and scope. For example, the present invention is not limited to any particular implementation or encryption scheme, and the invention may be implemented using various techniques for achieving the functionality described herein. The methods of the invention may be implemented in any appropriate operating system using appropriate programming languages and/or programming techniques or can be implemented in appropriately configured hardware implementations. Moreover, the present invention may be implemented in hardware or software. Software implementations can include single processor or multi-processor systems. Hardware implementations can be made on field programmable gate arrays (FPGAs), application specific integrated circuits (ASICs), digital signal processors (DSPs), or system on chip (SOC). Thus, the present invention is not limited to the presently preferred embodiments described herein, but may be altered in a variety of ways that will be apparent to persons skilled in the art based on the present description.

We claim:

1. A method for queue look-ahead key setup in a cryptographic system, the method comprising:
   receiving jobs in queue with each of the jobs consisting of work data and key data that is associated with a key type;
   designating plural duplicate key cryptographic engines using a same encryption scheme processing the key data of the jobs;
   designating plural duplicate work cryptographic engines using a same encryption scheme processing the work data of the jobs, the plural duplicate work cryptographic engines being different cryptographic engines from the plural duplicate key cryptographic engines;
   looking ahead into the job queue for one or more succeeding jobs to be performed;
   assigning the one or more succeeding jobs to one of the plural duplicate key cryptographic engines;
   outputting, from the one key cryptographic engine, processed key data to memory; and
   inputting the processed key data to one of the plural work cryptographic engines when the one work cryptographic engine is ready to process work data relating to the processed key data.

2. The method of claim 1, further comprising:
   in the one key cryptographic engine,
   receiving key data,
   processing the key data,
   generating processed key data, and
   storing the processed key data.

3. The method of claim 2, further comprising:
   processing the work data in the one work cryptographic engine, wherein processing includes
   retrieving the processed key data,
   receiving work data,
   processing the work data, and
   outputting the processed work data.

4. The method of claim 3, wherein the one key cryptographic engine is pipelined with the one work cryptographic engine.

5. The method of claim 3, wherein the one key cryptographic engine is optimized to perform key setup tasks of a cryptographic algorithm.

6. The method of claim 3, wherein the one work cryptographic engine is optimized to perform work data processing tasks of a cryptographic algorithm.

7. The method of claim 1, wherein the queue is developed from cryptographic tasks that arrive in batches or randomly.

8. The method of claim 1, further comprising:
   retaining, processed key data for processing of different work data.

9. The method, of claim 1, wherein processing the key data is performed in the one key cryptographic engine and processing of the work data is performed in the one work cryptographic engine.

10. A method for performing cryptographic tasks, the method comprising:
    maintaining cryptographic tasks in a queue, wherein the cryptographic tasks include key setup tasks and work data processing tasks;
    selecting a first cryptographic engine from plural duplicate cryptographic engines that use a same encryption scheme to process key data;
    performing the key setup tasks in the first cryptographic engine, wherein each of the key setup tasks includes
    receiving the key data,
    processing the key data,
    generating processed key data, and
    storing the processed key data;
    selecting a second cryptographic engine from plural duplicate cryptographic engines that use a same encryption scheme to process work data; and
    processing the work data in the second cryptographic engine, wherein each of the work data processing tasks includes
    retrieving the processed key data,
    receiving the work data,
    processing the work data, and
    outputting the processed work data, wherein the first cryptographic engine is pipelined with the second cryptographic engine.

11. The method of claim 10, further comprising:
    looking ahead into the queue for one or more succeeding cryptographic tasks to be performed; and
    performing a pipeline key setup for the one or more succeeding cryptographic tasks, the pipeline key setup being performed independently from, and it can performed be concurrently with, processing of the work data for any others of the cryptographic tasks, wherein for each cryptographic task, key setup tasks further include
    identifying a cryptographic algorithm for processing the work data,
    processing the key data from that cryptographic task so as to match its key type to the algorithm, wherein the key data in a matched key type is available for processing of the work data for that cryptographic task.

12. The method of claim 10, further comprising:
    monitoring the queue to identify key setup task and work data processing tasks;
    directing the key setup tasks to the first cryptographic engine; and
    directing the work data processing tasks to the second cryptographic engine.

13. The method of claim 10, wherein the queue is developed from cryptographic tasks that arrive in batches or randomly.

14. The method of claim 10, further comprising:
    retaining the stored processed key data for processing of different work data.

15. The method of claim 10, wherein each of the key setup tasks further includes identifying a cryptographic algorithm for processing the key data and work data.

16. The method of claim 15, wherein the cryptographic algorithm includes a DES algorithm, an RSA algorithm, a multi-prime algorithm, an AES algorithm, a Diffie-Hellman algorithm, or a hashing algorithm.

17. The method of claim 15, wherein the first cryptographic engine is optimized to perform tasks of the cryptographic algorithm.

18. The method of claim 15, wherein the second cryptographic engine is optimized to perform tasks of the cryptographic algorithm.

19. The method of claim 10, wherein the first cryptographic engine performs its tasks substantially in parallel with the second cryptographic engine.

20. A computer readable medium embodying program code having instructions for causing a computer to perform cryptographic tasks, comprising:
program code for receiving cryptographic tasks that include key setup tasks and work data processing tasks;
program code for selecting a first cryptographic engine from plural duplicate cryptographic engines that use a same encryption scheme to process key data;
program code for causing the computer to perform the key setup tasks in the first cryptographic engine, wherein each of the key setup tasks includes
receiving the key data,
processing the key data,
generating processed key data, and
storing the processed key data;
program code for selecting a second cryptographic engine from plural duplicate cryptographic engines that use a same encryption scheme to process work data; and
program code for causing the computer to process the work data in the second cryptographic engine, wherein each of the work data processing tasks includes
retrieving the processed key data,
receiving the work data,
processing the work data, and
outputting the processed work data, wherein the first cryptographic engine is pipelined with the second cryptographic engine.

21. The computer readable medium of claim 20, further comprising:
program code for causing the computer to perform queue look-ahead tasks that include looking ahead into the queue for one or more succeeding cryptographic tasks to be performed, and
performing a pipeline key setup for the one or more succeeding cryptographic tasks, the pipeline key setup being performed independently from, and it can be performed concurrently with, processing of the work data for any others of the cryptographic tasks, wherein for each cryptographic task, the key setup tasks further include
identifying a cryptographic algorithm for processing the work data,
processing the key data from that cryptographic task so as to match its key type to the algorithm, wherein the key data in a matched key type is available for processing of the work data for that cryptographic task.

22. The computer readable medium of claim 20, wherein the cryptographic tasks correspond to a cryptographic algorithm.

23. The computer readable medium of claim 22, wherein the cryptographic algorithm includes a DES algorithm.

24. The computer readable medium of claim 22, wherein the cryptographic algorithm includes a DES algorithm, an RSA algorithm, a multi-prime algorithm, an AES algorithm, a Diffie-Hellman algorithm, or a hashing algorithm.

25. The computer readable medium of claim 22, wherein the first cryptographic engine is optimized to perform tasks of the cryptographic algorithm.

26. The computer readable medium of claim 25, wherein the second cryptographic engine is optimized to perform tasks of the cryptographic algorithm.

27. The computer readable medium of claim 20, wherein the first cryptographic engine performs its tasks substantially in parallel with the second cryptographic engine.

28. A computer system comprising:
a plurality of duplicate key cryptographic engines using a same encryption scheme for processing key data;
a plurality of duplicate work cryptographic engines using a same encryption scheme for processing work data;
a memory for storing cryptographic tasks that include key setup tasks and work data processing tasks; and
a processor for selecting a first cryptographic engine from the duplicate key cryptographic engines and for selecting a second cryptographic engine from the duplicate work cryptographic engines, the processor interacting with the first and second cryptographic engines to cause the first cryptographic engine to perform the key setup tasks wherein each of the key setup tasks includes
receiving key data,
processing the key data,
generating processed key data, and
storing the processed key data, and to cause the second cryptographic engine to process the work data, wherein each of the work data processing tasks includes
retrieving the processed data,
receiving work data,
processing the work data, and
outputting the processed work data, wherein the first cryptographic engine is pipelined with the second cryptographic engine.

29. The computer system of claim 28, wherein the processor performs queue look-ahead tasks that include
looking ahead into queue for one or more succeeding cryptographic tasks to be performed, and
performing a pipeline key setup for the one or more succeeding cryptographic tasks, the pipeline key setup being performed independently from, and it can be performed concurrently with, processing of the work data for any others of the cryptographic tasks, wherein for each cryptographic task, key setup tasks further include
identifying a cryptographic algorithm for processing the work data
processing the key data from that cryptographic task so as to match its key type to the algorithm, wherein the key data in a matched key type is available for processing of the work data for that cryptographic task.

30. The computer system of claim 28, wherein the cryptographic tasks correspond to a cryptographic algorithm.

31. The computer system of claim 30, wherein the cryptographic algorithm includes a DES algorithm, an RSA algorithm, a multi-prime algorithm, an AES algorithm, a Diffie-Hellman algorithm, or a hashing algorithm.

32. The computer system of claim 30, wherein the first cryptographic engine is optimized to perform tasks of the cryptographic algorithm.

33. The computer system of claim 30, wherein the second cryptographic engine is optimized to perform tasks of the cryptographic algorithm.

34. The computer system of claim 28, wherein the first cryptographic engine performs its tasks in parallel with the second cryptographic engine.

* * * * *

UNITED STATES PATENT AND TRADEMARK OFFICE
CERTIFICATE OF CORRECTION

PATENT NO. : 7,318,160 B2
APPLICATION NO. : 10/062808
DATED : January 8, 2008
INVENTOR(S) : Dale W. Hopkins et al.

It is certified that error appears in the above-identified patent and that said Letters Patent is hereby corrected as shown below:

In column 5, line 49, delete "304-l" and insert -- 304-1 --, therefor.

In column 6, line 28, delete "306-w" and insert -- 304-w --, therefor.

In column 13, line 14, in Claim 1, after "jobs in" insert -- a --.

In column 13, line 60, in Claim 8, after "retaining" delete ",".

In column 13, line 62, in Claim 9, after "method" delete ",".

In column 14, lines 30-31, in Claim 11, delete "performed be" and insert -- be performed --, therefor.

In column 14, line 43, in Claim 12, delete "task" and insert -- tasks --, therefor.

In column 16, line 24, in Claim 28, after "processed" insert -- key --.

In column 16, line 43, in Claim 29, after "data" insert -- , --.

Signed and Sealed this

Tenth Day of June, 2008

JON W. DUDAS
*Director of the United States Patent and Trademark Office*